United States Patent
Hsiang

(10) Patent No.: US 9,876,786 B2
(45) Date of Patent: Jan. 23, 2018

(54) METHOD FOR VERIFYING SECURITY DATA, SYSTEM, AND A COMPUTER-READABLE STORAGE DEVICE

(71) Applicant: iDGate Corporation, New Taipei (TW)

(72) Inventor: Ke-Hsi Hsiang, New Taipei (TW)

(73) Assignee: IDGATE CORPORATION, New Taipei (TW)

( * ) Notice: Subject to any disclaimer, the term of this patent is extended or adjusted under 35 U.S.C. 154(b) by 1 day.

(21) Appl. No.: 14/687,454

(22) Filed: Apr. 15, 2015

(65) Prior Publication Data

US 2016/0044033 A1 Feb. 11, 2016

(30) Foreign Application Priority Data

Aug. 8, 2014 (TW) .............................. 103127319 A

(51) Int. Cl.
*G06F 7/04* (2006.01)
*H04L 29/06* (2006.01)

(52) U.S. Cl.
CPC ...... *H04L 63/0853* (2013.01); *H04L 63/0892* (2013.01); *H04L 63/18* (2013.01); *H04L 2463/102* (2013.01)

(58) Field of Classification Search
CPC . H04L 63/0853; H04L 63/0892; H04L 63/18; H04L 2463/102
USPC .......................................................... 726/5
See application file for complete search history.

(56) References Cited

U.S. PATENT DOCUMENTS

| | | | |
|---|---|---|---|
| 6,510,236 B1* | 1/2003 | Crane ................... | G06F 21/32 382/116 |
| 8,701,199 B1* | 4/2014 | Dotan ................... | H04L 63/08 726/25 |
| 9,112,842 B1* | 8/2015 | Gallagher, III ......... | G06F 21/33 |
| 2003/0084292 A1* | 5/2003 | Pierce .................. | G06F 21/606 713/168 |
| 2005/0044377 A1* | 2/2005 | Huang ................... | G06F 21/33 713/182 |

(Continued)

FOREIGN PATENT DOCUMENTS

| TW | I231681 | 4/2005 |
|---|---|---|
| TW | 200627216 | 8/2006 |

(Continued)

*Primary Examiner* — Mohammad W Reza
(74) *Attorney, Agent, or Firm* — Li & Cai Intellectual Property (USA) Office

(57) ABSTRACT

The disclosure herein is related to a method for verifying security data, a system, and a computer-readable storage device. The system includes an application server for providing service, and receiving a service request made by a terminal. The system also includes an authentication server for providing identification authentication for receiving a request made by the application server for verifying the terminal. The authentication server sends a signal to the terminal for initiating an authentication process, and processing authentication with the terminal. The authentication server delivers transaction data for the terminal to complete the service access when the connection between the server and terminal is verified. The terminal is permitted to access the service when the terminal passes the authentication and submits a request form according to the data to the application server.

15 Claims, 7 Drawing Sheets

(56) References Cited

U.S. PATENT DOCUMENTS

| | | | |
|---|---|---|---|
| 2006/0048212 A1* | 3/2006 | Tsuruoka | H04L 9/0866 726/4 |
| 2010/0107228 A1* | 4/2010 | Lin | H04L 9/321 726/5 |
| 2011/0264910 A1* | 10/2011 | Masuda | H04L 63/06 713/155 |
| 2012/0124656 A1* | 5/2012 | Senac | H04L 9/3213 726/9 |
| 2012/0129492 A1* | 5/2012 | Mechaley, Jr. | G06Q 20/027 455/411 |
| 2013/0312073 A1* | 11/2013 | Srivastav | H04L 9/3215 726/7 |
| 2015/0180868 A1* | 6/2015 | Sng | H04L 63/0884 726/9 |

FOREIGN PATENT DOCUMENTS

| | | |
|---|---|---|
| TW | 201342270 A | 10/2013 |
| TW | 201419888 A | 5/2014 |

* cited by examiner

METHOD FOR VERIFYING SECURITY DATA, SYSTEM, AND A COMPUTER-READABLE STORAGE DEVICE

BACKGROUND OF THE INVENTION

1. Field of the Invention

The present invention is related to a method and a system for verifying security data, more particularly, to a method using an authentication server to provide an additional verification process onto the original transaction process, and a system thereof, and also a computer-readable storage device.

2. Description of Related Art

Identity verification is one adequate mechanism provided for a user to access a service such as shopping or other transaction rendered by a server over a network. In general, the service member will be required to logon the server using his registered account and password. However, many safer verifying methods have been developed since conventional verifications do not comply with serious security requirements. For example, one aspect of dynamic password technology allows the user to acquire a unique dynamic password using a Token with which he instantly accesses a service. This kind of dynamic password will be invalid as it merely applies for this instant service.

Moreover, along with the widespread applications made for mobile devices, some technologies have been developed to perform the identity verification similar to the conventional Token. One of the technologies is to provide a service cooperating with a telecommunication company, in which, when the user logons for a specific service, the server first obtains the logon data. The telecommunication company acts as an authentication provider when it sends a password to the user with its SMS service. The password is provided for the user to fill in using an interface and successfully logon the service. It is noted that this type of dynamic password is often adopted by a gaming system or cyber banking system.

SUMMARY OF THE INVENTION

Disclosure in accordance with the present invention is related to a method and a system for verifying security data over a network, and also to a computer-readable media. The major features of the method are to provide an authentication server to verify the user's terminal device when the user uses the device to access a specific network service. The authentication server generates the transaction data for the user to completely access the service, and allows the terminal device to securely accomplish the whole service procedure.

According to the embodiment in the disclosure, in the method for verifying security data, an application server receives a service request from a terminal. For example, the user uses a computer to access a specific website. Further, in the method, the application server notifies an authentication server to verify the user, and to deliver a signal initiating the verification to the terminal. For example, a notification is sent to the user's mobile device. At that moment, the terminal is required to initiate software for performing the verification process with the authentication server. For example, the authentication server delivers a golden key set by registering in the server. By this golden key, the authentication server verifies the mobile device and confirms the terminal and the server are protected.

After this stage of verification, the authentication server delivers a transaction data relating the service to the terminal. For example, the transaction data is delivered by means of encrypted packages. The packages are decrypted and applied to a form. The data in the form may be verified again as delivered to the authentication server. The user is permitted to access the service after verification.

In one related embodiment, the system for verifying security data in accordance with the present invention includes an application for rendering the service. The application server receives a service request from the terminal, and receives the data submitted from the terminal. An additional authentication server is provided in the system for identity verification. The authentication server receives the request for security verification from the application server. The authentication server transmits a signal initiating the verification to the terminal, and performs the verification process with the terminal. When the verification is completed, a transaction for completing the service is delivered to the terminal. The verification allows the user to accomplish the service access. Furthermore, the transaction data may be used for re-verifying the terminal and the related software.

The program instructions for conducting the method for verifying security data are stored in a computer-readable storage device. The instructions are executed in a mobile device. The instructions include an instruction for receiving a signal initiating verification process from an authentication server; an instruction for initiating software according to the initiation signal; an instruction for performing verification with the authentication server; an instruction for receiving transaction data from the authentication server for accomplishing verification; and an instruction for providing a form for confirming the transaction data according to all or part of the transaction data.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
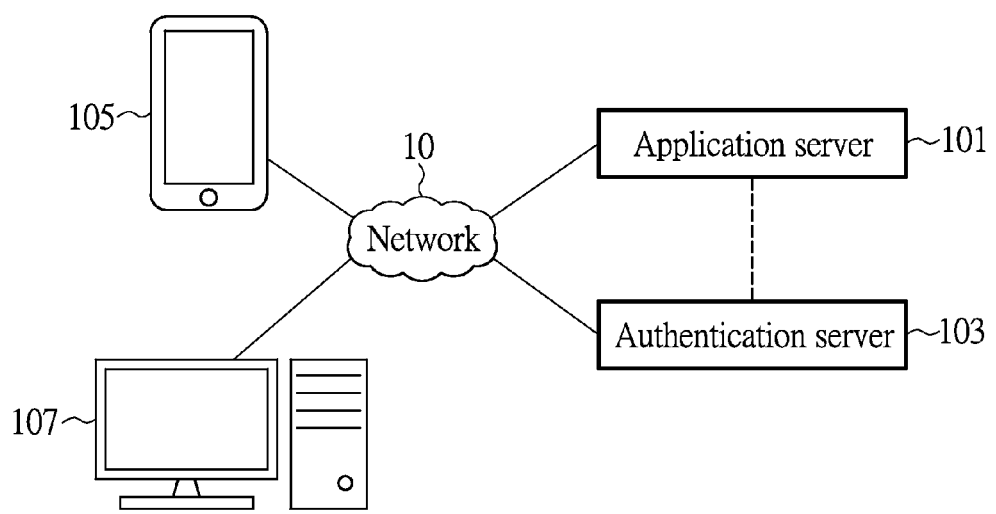
FIG. 1 shows a schematic diagram depicting a network framework of system for verifying security data in accordance with one embodiment of the present invention.

Reference is made to FIG. 1, a network framework of the system for verifying security data in accordance with the present invention is exemplarily described.

In the system, several parties are interconnected over a network 10. In the system, an application server 101 is provided to render services for users. The application server 101 receives a service request made by a terminal, e.g. a second terminal device 107, and also receives relevant data submitted by the terminal. The data to be submitted is such as a user account, password, member information, credit data and/or a transaction list.

In an exemplary embodiment, the application server 101 serves as a network server with high security requirements. The server is such as a shopping platform, gaming server, or network banking server. The user uses a second terminal device 107 to access the service rendered by the application server 101. The application server 101 will notify an authentication server 103 as receiving the service request made by the second terminal device 107. The authentication server 103 is in charge of authenticating the user ID. The mentioned terminal device accessing the application server 101 may be, but is not limited to, the shown first terminal device 105 such as a user-end mobile device.

When the authentication server 103 receives the notice regarding a specific service from the application server 101, the authentication server 103 simultaneously obtains the related information for processing the verification. The information is such as user data, account data, and/or hardware information. The information is provided for safety verification, in which, a signal initiating verification is generated and sent to a terminal device such as the first terminal device 105, e.g. the mobile device.

When the signal is delivered, a notification method may be adopted to deliver the signal initiating verification to the terminal device. For example, the first terminal device 105 initiates software in response to the signal requiring initiation of verification from the authentication server 103. The software to be initiated is such as an APP installed in the mobile device. The APP allows the user to submit the data in a form for accessing the service in the application server 101.

When the user manipulates the software, the software may require ID verification for security requirement. The related verification is such as a user password, identity verification graphics, or biometric method including fingerprint, or human face recognition. Furthermore, the hardware verification may also be accompanied with the ID verification. The software is successfully initiated after the verification is done.

The software instructs driving the first terminal device 105 to establish connection with the authentication server 103, and process verification with the authentication server 103. This verification process is provided for preventing improper use or network security threats by malware such as an implanted Trojan. The verification process is made by verifying the connection between the server and the software at the terminal, and ensuring the connection is in compliance with prior registration.

The method for verification includes exchanging verification data by the two parties. The exchanged data is such as a challenge code generated based on hardware information, or golden keys. For example, the first terminal device delivers a golden key generated as a logon to the system, by which the authentication server authenticates the mobile device. Therefore, the connection between the server and the terminal device can be securely authenticated. After the connection verification, the authentication server 103 delivers a transaction data for completing the service to the first terminal device 105. When the user confirms the transaction data, the authentication server 103 is notified to inform the application server 101 permitting the service access.

In the diagram, the first terminal device 105 is such as a mobile device, and the second terminal device 107 is a normal computer system. The user uses the second terminal device 107 to logon the application server 101 for accessing a service. The user then uses the first terminal device 105 to conduct ID verification. The first terminal device 105 may firstly perform the verification process with the authentication server 103, and obtain the transaction data from the authentication server 103 for passing the verification. Therefore, the software at the first terminal device 105 can create a form or data for the verification. The second terminal device 107 is then permitted to access the service when the authentication server 103 acknowledges that the user confirmed the data.

It is noted that, when the software is used to confirm the transaction data at the first terminal device 105, the device 105 may be required to read data from an identification device using the same or different software under a short-range wireless communication protocol. When the verification is accomplished, the transaction data is then confirmed, and the authentication server 103 is informed. The mentioned identification device may be a card or other device used for ID verification. The data for ID verification is also the data registered in the software installed in the terminal device beforehand. The device includes circuitry and antenna in compliance with a specific short-range wireless communication protocol, which is allowed to communicate with the terminal device disposed with the circuitry complying with the same short-range wireless communication protocol. When the data is exchanged under the short-range wireless communication protocol, the illegal use of the first terminal device 103 can be precluded.

The short-range wireless communication protocol is such as a Near Field Communication (NFC), which allows the user to conduct non-contact data exchange between the identification device and the first terminal device 105 for confirming the transaction data. When the software is verified as exchanging the verification data, the signal for confirming the transaction data is delivered to the authentication server 103.

According to one further embodiment, the first terminal device 105 and the second terminal device 107 may play their roles in one single device. Still further, this single device also needs to be verified by the authentication server 103, and initiates the software when the verification is done. The device alone receives the data as it passes the verification. The device successfully accesses the service to be requested in the application server 101 when the transaction data has been verified by the process.

Figure 2:
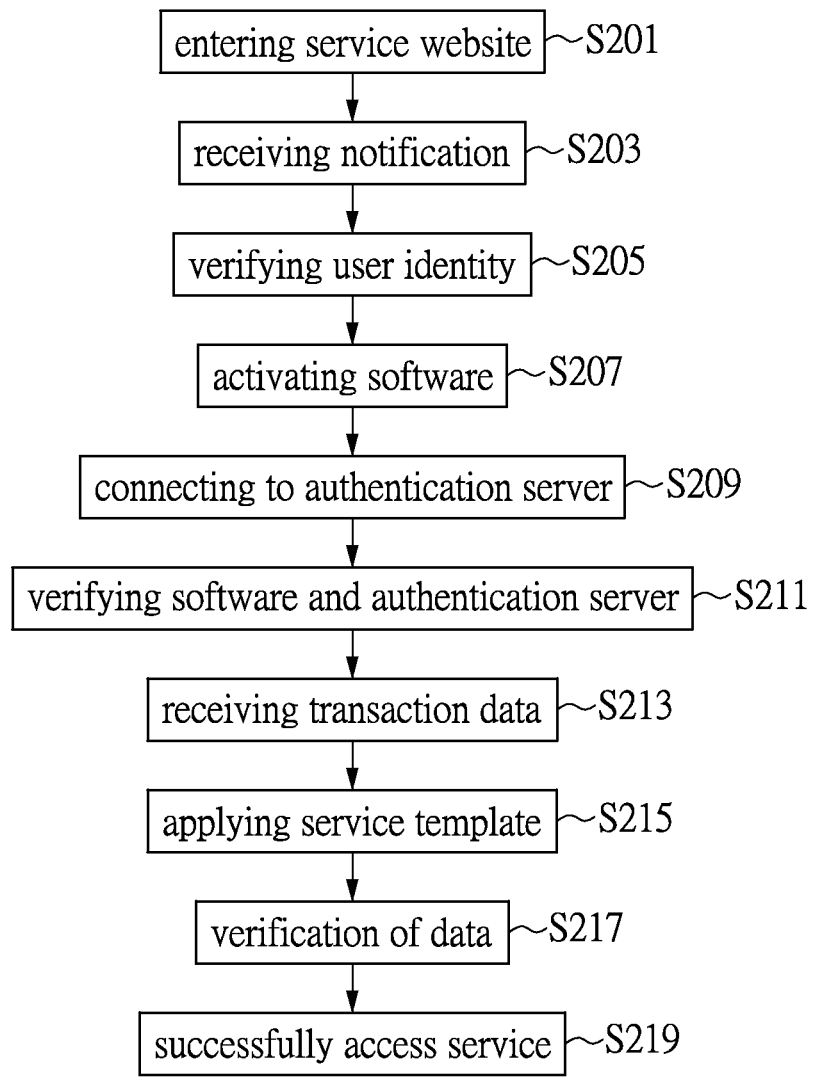
FIG. 2 shows a flow chart illustrating method for verifying security data at the client end in one embodiment of the present invention.

Refer to FIG. 2, which shows a flow chart depicting the process to verify the security data at the client end.

In the beginning, such as step S201, the user operates a terminal device to establish a link to the application server, and logon a website directed to a service. The server is especially providing the service which requires cash flow and needs of a business such as a shopping website, network banking website, or a gaming server. The user or any member registered to access the service may click a link to make the request. The service may ask the user to fill in transaction data, including user account, password, account data, credit information, an order for goods, or any shopping item. In the meantime, the application server informs the authentication server to authenticate the user.

When the authentication server receives the notice authenticating the user, the authentication server sends a notification over the network to the terminal based on the user information from the notice made by the application server. In step S203, the terminal receives the notification. The above-mentioned embodiments show the terminal may be one single device or two or more different devices for accessing the service and processing the authentication.

In the mentioned step S203, the authentication server also delivers a signal initiating the software to perform the verification process at the terminal when a notifying message is sent to the terminal over network. After that, such as step S205, the terminal device automatically initiates the software and simultaneously verifies the user ID to use the software. Next, in step S207, the software is initiated when the verification is done.

In one embodiment, the software used to process verification in accordance with present invention is installed in the terminal device before the operation. The terminal device is such as a mobile device which installs a mobile application program, e.g. APP. Before the first time executing the software, the user is required to make a registration in the server rendering the service. Such as in the mentioned authentication server, a confirmation code is generated. The confirmation code may be bundled hardware information such as International Mobile Equipment Identity number (IMEI) unique for every mobile device. Therefore, the registered confirmation code is an essential code to initiate the software since it bundles the hardware data, otherwise the software may not correctly initiate using another device. This scheme is to make sure the device is registered without any tampering.

When the software is initiated, such as step S209, the software automatically links to the authentication server. The software then performs a verification process with the authentication server for ensuring both legitimacy and safe connection, such as step S211. When the verification process at this stage is done, the terminal device is permitted to receive a transaction delivered from the authentication server over a secure connection. The terminal device generates a message to respond to the authentication server at this moment. The authentication server continuously delivers the transaction data until the transaction data delivery is accomplished, such as step S213.

In the step S213, the authentication server may encrypt the data to be delivered according to a method agreed by each other. The encryption ensures the security of the data to be delivered. At the terminal end, the terminal device obtains the data for decrypting the data according to a corresponding method, such as step S215. A template may be applied to the data for forming a multiple-field table or a form submitted to the application server in order to access a specific service. Next, in step S217, this content in the table or form should be in compliance with the original transaction data filled for accessing the service. The user may confirm the content by this step.

In the current step, in one embodiment of the present invention, the user operates the software to confirm the transaction data. In the meantime, for security considerations, the same software or one other software may be adopted to read an identification device by a short-range wireless communication protocol. The identification device may be a form of IC card, or other type of transceiver. When the data read out from the identification device is verified according to pre-registered information, the transaction data is verified for further confirmation. This signal of verification may then be delivered to the authentication server. This verification process strengthens the security requirement in accordance with the present invention. The mentioned short-range wireless communication protocol is exemplarily made by a Near Field Communication (NFC) technology.

According to one further embodiment, the system may still perform one more verification process. For example, the table or form, or all or part of the decrypted transaction data may be incorporated to generate verification data according to a specific algorithm. The verification data is delivered to the authentication server for last verification. In the meantime, the authentication server calculates the all or part of the transaction data using a corresponding algorithm for verifying the verification data delivered from the terminal device. It is noted that the verification data delivered from the terminal device may be in the form of encrypted strings. The application server is notified when the verification is accomplished in the authentication server. The user is permitted to access the chosen service, e.g. a transaction, in step S219.

For example, the verification process made between the authentication server and the terminal may be based on the pre-registered data, especially based on the hardware information at the terminal. The hardware information is such as IMEI for a mobile device and its user data. These data can be calculated to form the verification data in order to verify the registered device.

It is also noted that, for various security considerations, the terminal device may be the same or different at different stages to implement the verification process. For example, a computer host at the terminal may be used to link to the application server, and another mobile device may be used to process the verification for accomplishing the transaction.

FIGS. 3A, 3B, 3C and 3D schematically show the software screens in a terminal device, especially in a display of a mobile device.

Figure 3A:
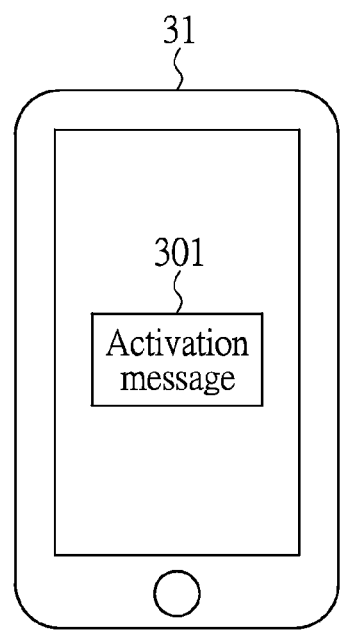
FIGS. 3A, 3B, 3C and 3D shows diagrams depicting using a mobile device to perform the method for verifying security data according to one embodiment of the present invention.

In FIG. 3A, a mobile device 31 is shown at the terminal. The mobile device 31 or other type of computer device is used to logon the application server for accessing service. The mobile device 31 may instantly receive an activation message 301 delivered by an authentication server.

When receiving the activation message 301, a software program installed in the mobile device 31 can be initiated. In the meantime, when the user operates the software, the user is required to perform ID verification, for example, but not being limited to, using a user password, identity verification graphics, or biometric verification using fingerprint, human face or the like. The software may be successfully initiated when the verification is done.

Figure 3B:
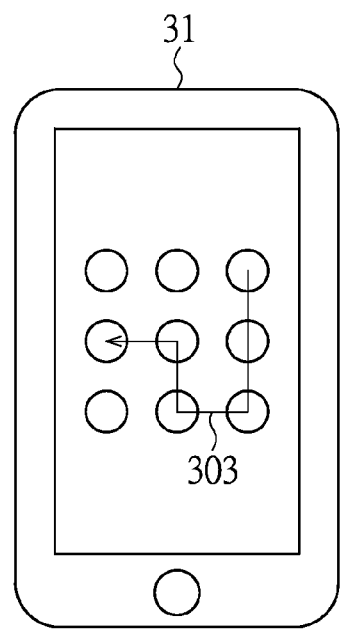

In FIG. 3B, the mobile device 31 initiates a process of identification. A confirmation code may be exemplarily depicted as an identity verification graphics 303. The confirmation code allows the user to unlock to software by drawing traces according to agreed identity verification graphics 303. After that, the software is initiated when the verification is done.

Figure 3C:
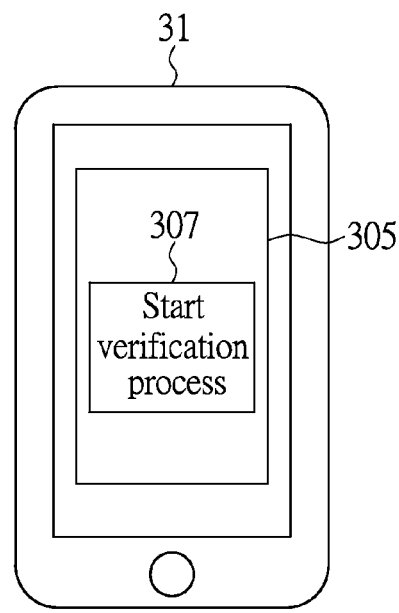

In FIG. 3C, the software 305 initiated in the mobile device 31 may automatically establish connection with an authentication server. A verification process 307 is simultaneously performed. The mobile device 31 may exchange verification data with the authentication server. For example, the exchanged data may be a golden key pair, and an algorithm is performed to generate the key pair which is utilized to verify the parties.

Figure 3D:
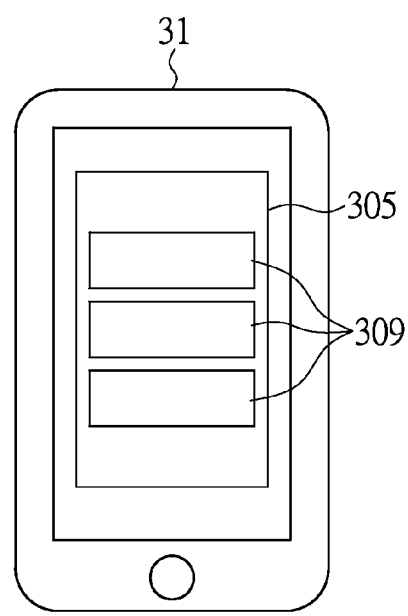

After accomplishing the verification process, such as in FIG. 3D, the mobile device 31 is able to receive the transaction data from the authentication server. The transaction data for completing the transaction may be referred to, to create a form for applying a specific template by the software 305. When an application form 309 is created, the user is asked to confirm the content in the application form 309. The authentication server may therefore receive the confirmation signal when the user confirms the content via an interface. The application server is then notified by the authentication server permitting the user to logon for the service.

Figure 4:
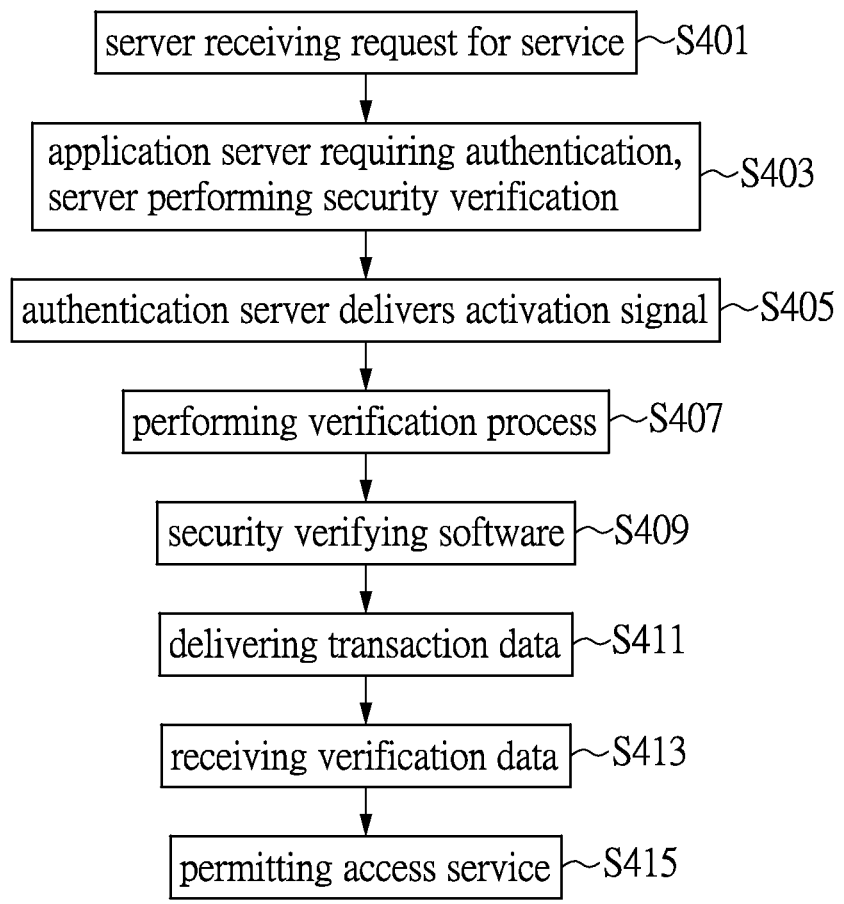
FIG. 4 shows a flow chart illustrating the method of verification performed at a server end in one embodiment of the present invention.

Refer to FIG. 4 showing a flow chart depicting the method for verifying the security data at the server end according to one embodiment of the present invention.

The services rendered at the server end may be implemented by one single or different server hosts, such as the services made by the application server and the authentication server. In the beginning, such as step S401, when the application server receives a service request made by the terminal, the application server acquires the user information from the member data or the previous registered data. The application server also receives the transaction data submitted by the terminal. The authentication server is notified to process the safety verification. In step S403, one of the objectives of the authentication server is to authenticate the user, and also the device held by the user and to verify legitimacy of the relevant software.

In the meantime, in step S405, the authentication server delivers a signal of activation to a designated terminal device according to the information sent by the application server. The signal of activation may be delivered by means of notification over a network. The terminal device accordingly initiates the relevant software according to the signal of activation, and begins to perform verification process, such as step S407.

During the verification process, the relevant software at the terminal delivers a verification data back to the authentication server as the terminal receiving the signal of activation. As an example, the verification data generated by the terminal is calculated, for example by an algorithm, based on the user data or/and hardware information. The authentication server will check the verification data by comparing with the pre-registered data in the server. Alternatively, the authentication server may perform the comparison by the same or a corresponding algorithm. When the authentication server accomplishes the verification process, the legitimacy of the software is also checked, as in step S409. The transaction data is therefore transmitted. In an exemplary example, this transaction data is consistent with the original transaction data submitted by the terminal for a specific service in the beginning step S401.

In the terminal device, the received transaction data is decrypted at the terminal. A table submitted to the server is therefore created, especially for the user to confirm the transaction content. When the user confirms the data through the software, all or part of the transaction data is referred to, to generate a verification data at the terminal. The verification data is then transmitted to the authentication server for a second confirmation. In the authentication server, as step S413, the verification data is received and used to re-verify the data registered in the server using the corresponding algorithm.

By this confirmation, the authentication server informs the application server regarding the confirmation, the application server accordingly permits the user to access the specified service, such as step S415.

Figure 5:
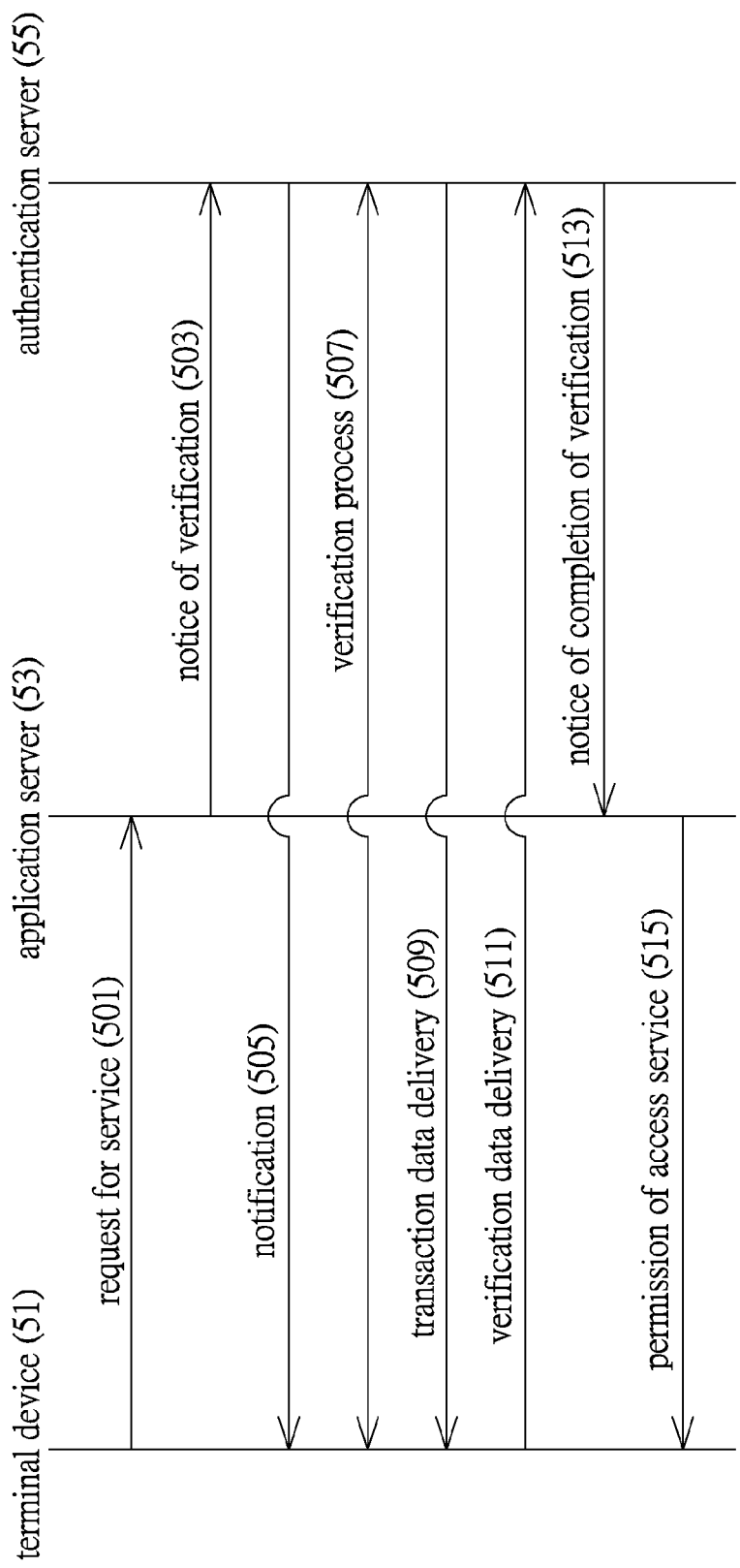
FIG. 5 shows a flow chart exemplarily illustrating the system operation in accordance with the method of the present invention.

Reference is made to FIG. 5 illustrating the system to embody the operation for verifying security data in accordance with the present invention. The system includes the operations made by at least three parties. A terminal device 51 is included. The terminal device 51 is made by one single or different computer devices. An application server 53 is included to render the service. An authentication server 55 is used to perform the verification process. It is worth noting that the servers indicate some kinds of services within the system. That means both the application server 53 and the authentication server 55 are implemented to render the at least two services by computer hosts or a serving system. Further, the services made by the servers 53 and 55 may be provided by two separate service providers at different systems.

According to the method for verifying the security data in the above embodiments, the terminal device 51 issues signals regarding a request of service (501) to the application server 53. The application server 53 then receives the service request, and asks the authentication server 55 to verify the terminal (503) which submits the request. In this step, the legitimacy of the terminal device 51 is verified.

Next, the authentication server 55 issues a notification to the terminal device 51 for the purpose of enabling the verification process (505). Preferably, the authentication server 55 delivers the signal initiating the verification process to the terminal by a notification message over a network. When the terminal device 51 acknowledges the signal of initiation, the terminal device 51 initiates a software by this signal (505). According to one of the embodiments, the terminal initiates identity verification through the software for authorizing initiating the software when receiving the signal initiating the verification (505). Reference is made to FIG. 3B, the terminal device 51 is authorized to initiate the software.

After that, both the terminal device 51 and the authentication server 55 perform the verification process (507). The connection between the terminal device 51 and the authentication server 55 is verified. For example, both parties may confirm the connection by exchanging the verification data. The verification data in this stage is such as golden keys provided for both parties to verify the connection. When this verification process is accomplished, the authentication server 55 then delivers transaction data to the terminal device 55 (509). For example, the authentication server 55 delivers the data using encrypted packages. When the terminal device 51 decrypts the packages, the user is allowed to confirm the content in a table created by the decrypted transaction data through the software. In one embodiment, the terminal device 51 is therefore permitted to access the service rendered by the application server 53.

It is noted that, the transaction data delivered by the authentication server 55 is acquired when the application server 53 receives the service request submitted by the terminal device 51, and the authentication server 55 is acknowledged.

In one further embodiment, when the terminal device 51 receives the transaction data transmitted by the authentication server 55 (509), the user can confirm the content of transaction. The terminal device creates a verification data based on all or part of the received transaction data using an algorithm. This algorithm may be installed in the software initiated at the terminal. The terminal device 51 then transmits the verification data to the authentication server 55 (511). The authentication server 55 re-verifies the verification data by a corresponding algorithm. After this stage of verification, the authentication server 55 informs the application server 53 regarding finishing the verification (513). The application server 53 therefore permits the terminal device 51 to access the requested service (515).

Figure 6:
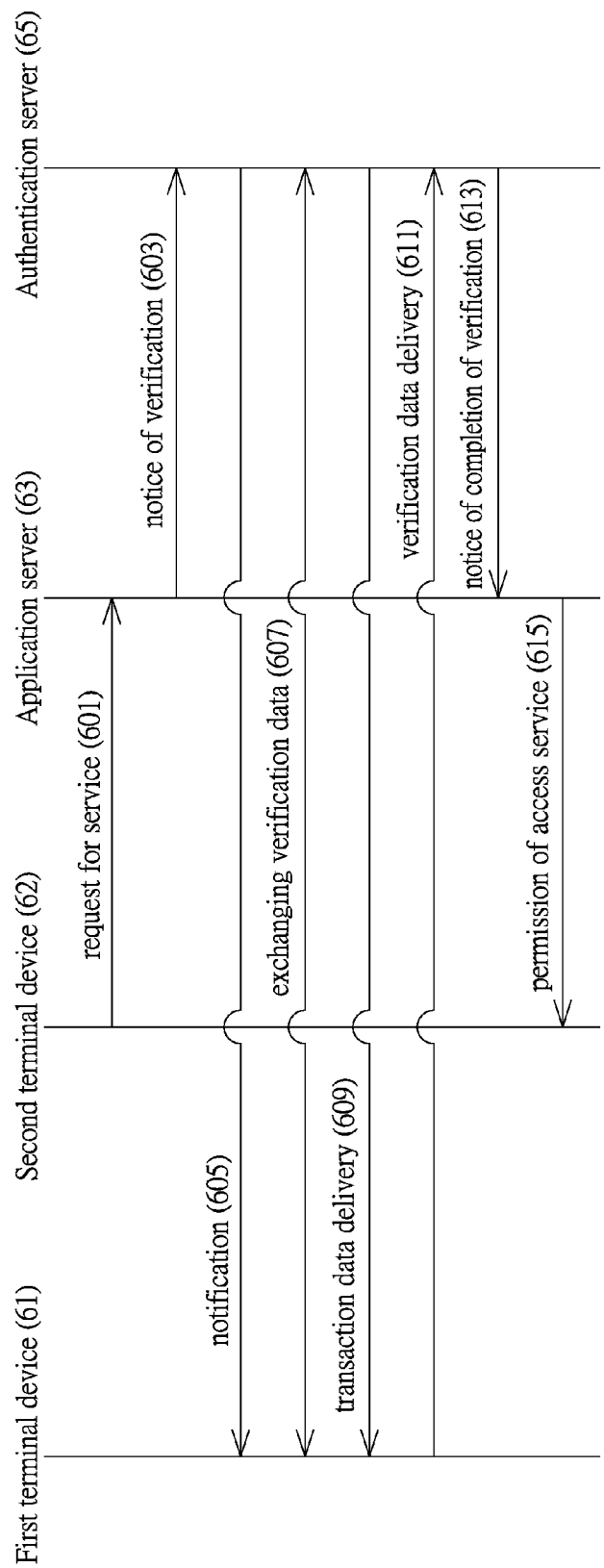
FIG. 6 shows another flow chart illustrating the system operation in accordance with the method of the present invention.

In FIG. 6, the flow chart illustrates the process allowing the user to perform the verification by a mobile device and as well using an ordinary computer device to access the service.

A second terminal device 62 is used to issue the request for service to an application server 63 (601). A transaction data is submitted to the application server 63 from the second terminal device 62. The application server 63 then informs the authentication server 65 to authenticate the terminal (603).

The authentication server 65 instantly issues a notification to a first terminal device 61 (605). The first terminal device 61 initiates software to exchange verification data with the authentication server 65 (607). The authentication server 65 verifies the legitimacy of the first terminal device 61. The first terminal device 61 is also allowed to verify the connection with the authentication server 65. However, in the present embodiment, the first terminal device 61 and the second terminal device 62 are two separate terminal devices, namely one of the devices performs the verification process when the other one device requests a service. The process for requesting the service is therefore verified.

When the verification process has been accomplished, the authentication server 65 delivers the transaction data to the first terminal device 61 (609). It is also noted that this transaction data is consistent with the original transaction data in a table filled in by the second terminal device 62 and submitted to the application server 63. The transaction data may include user data, credit data, service item, and an order. When the first terminal device 61 finally receives the transaction data, a template may be applied to the data as decryption. The template may not be applied in one further embodiment. A transaction table is created and provided for the user to confirm the details in the first terminal device 61. The terminal device 61 is authorized to access the service.

However, in one embodiment, the system may use a mechanism to re-verify the transaction data. For example, the first terminal device 61 may calculate a verification data and transmit the data to the authentication server 65 (611). The authentication server 65 uses a corresponding algorithm to check the verification data, and to verify the data over the connection with the first terminal device 61.

The authentication server 65 then notifies the application server 63 regarding accomplishment of the verification (613). The server 65 then permits the second terminal device 62 to access the requested service (615).

The disclosure in accordance with the present invention is also relating to a computer-readable storage device. The storage device is a non-transitory memory in a mobile device, and used to store the instruction set executable for verify the security data. The instructions are executed by a processor in the mobile device. The instructions are executed to process the steps in the embodiments. The instruction set includes an instruction for receiving a signal for initiating the verification process from an authentication server; an instruction for initiating software according to the initiation signal; an instruction for performing verification process with the authentication server; an instruction for receiving transaction data for completing the service from the authentication server after verification; and an instruction for providing a table for confirming transaction data according to all or part of the transaction data.

To sum up, the method and system for verifying security data provide a mechanism using an authentication server to perform high security verification process with a terminal accessing a network service. It is featured that no password is required to perform the verification according to the embodiment. Finally, the terminal device is then authorized to access the service after accomplishing the verification.

It is intended that the specification and depicted embodiment be considered exemplary only, with a true scope of the invention being determined by the broad meaning of the following claims.

What is claimed is:

1. A method for verifying security data, comprising:
an application server receiving a request for service, including an original transaction data, from a terminal;
the application server notifying an authentication server to verify the terminal, and the authentication server obtaining transaction data being consistent with the original transaction data from the application server;
the authentication server delivering a signal for initiating a verification process to verify legitimacy of the terminal and causing the terminal to initiate a software to process the verification process with the authentication server;
the authentication server transmitting the transaction data being consistent with the original transaction data to the terminal after the terminal is verified in the verification process;
based on the transaction data received from the application server, the authentication server using a corresponding algorithm to verify a verification data that is received from the terminal when the terminal uses an algorithm to generate the verification data according to all or part of the transaction data received from the authentication server after the transaction data is confirmed by a user of the terminal via an interface; and
the application server being notified to permit the terminal to access the requested service when the authentication server re-verifies the terminal according to the verification data with respect to the transaction data being consistent with the original transaction data submitted by the terminal to the application server.

2. The method according to claim 1, wherein, the terminal initiates identity verification through the software for authorizing initiating the software when receiving the signal for initiating the verification.

3. The method according to claim 2, wherein the authentication server delivers the signal for initiating the verification process to the terminal by a notification message over a network.

4. The method according to claim 3, wherein the terminal is a computer system which generates the service request to the application server, and executes the software for accomplishing the verification.

5. The method according to claim 4, wherein the transaction data is delivered with encrypted packages by the authentication server and the terminal provides a form for verifying the transaction data when the terminal decrypts the transaction data.

6. The method according to claim 3, wherein the terminal includes a first terminal device used to receive the signal for initiating the verification and to perform the software; and a second terminal device used to deliver the service request.

7. The method according to claim 6, wherein the transaction data is delivered with encrypted packages by the authentication server and the terminal provides a form for verifying the transaction data when the terminal decrypts the transaction data.

8. The method according to claim 1, wherein, after the terminal receives the transaction data, a template is applied to create a form with multiple fields.

9. The method according to claim 1, wherein the step of verifying the transaction data using the software initiated by the terminal, further includes the software reading an identification device over a short-range wireless communication protocol, and then the transaction data undergoing the verification.

10. A system for verifying security data, comprising:
an application server used to provide services, receiving a service request and an original transaction data submitted by a terminal over a network; and
an authentication server used to authenticate a user ID, receiving a request made by the application server to perform safety verification; transmitting a signal for initiating verification to the terminal, and performing a verification process to verify legitimacy of the terminal; and transmitting a transaction data to the verified terminal allowing a user of the terminal to check if it is consistent with the original transaction data submitted by the terminal to the application server via an interface;
wherein,
the authentication server uses a corresponding algorithm to verify a verification data that is received from the terminal when the terminal users an algorithm to generate the verification data according to all or part of the transaction data received from the authentication server after the transaction data is confirm by the user of the terminal via an interface; and
the application server is notified to permit the terminal to access the requested service when the authentication server re-verifies the terminal according to the verification data with respect to the transaction data being consistent with the original transaction data submitted by the terminal to the application server.

11. The system according claim 10, wherein the terminal includes a first terminal device used to receive the signal for initiating the verification and to perform the software; and a second terminal device used to deliver the service request.

12. The system according to claim 10, wherein the authentication server delivers the signal for initiating the verification process to the terminal by a notification message over a network.

13. The system according to claim 10, wherein the transaction data is delivered with encrypted packages by the authentication server and the terminal provides a form for verifying the transaction data when the terminal decrypts the transaction data.

14. The system according to claim 10, wherein, when the terminal verifies the transaction data using the software, further includes the software reading an identification device over a short-range wireless communication protocol, and then the transaction data undergoing the verification.

15. A computer-readable storage device, storing an instruction set executable to verify security data in a mobile device, a processor of the mobile device used to execute the instruction set for:
submitting a request for service, including an original transaction data, to an application server;
receiving a signal for initiating a verification process from an authentication server when the authentication server is notified from the application server for verifying the mobile device, and the authentication server also obtains transaction data being consistent with original transaction data from the application server;
initiating a software to process the verification process with the authentication server for verifying legitimacy of the terminal;
receiving the transaction data being consistent with the original transaction data from the authentication server after the terminal is verified in the verification process;
using an algorithm to generate a verification data according to all or part of the transaction data received from the authentication server after the transaction data is confirmed by a user of the terminal via an interface;
transmitting the verification data to the authentication server, and simultaneously the authentication server using a corresponding algorithm to verify the verification data based on the transaction data received from the application server; and
being permitted to access the requested service by the application server when the authentication server re-verifies the terminal according to the verification data with respect to the transaction data being consistent with the original transaction data submitted by the terminal to the application server.

* * * * *